(12) United States Patent
Kashihara et al.

(10) Patent No.: US 8,430,382 B2
(45) Date of Patent: Apr. 30, 2013

(54) STOPPER STRUCTURE OF TORQUE ROD

(75) Inventors: Hiroyuki Kashihara, Komaki (JP); Jyoji Tsutsumida, Komaki (JP); Satoshi Umemura, Gifu-ken (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 211 days.

(21) Appl. No.: 13/024,680

(22) Filed: Feb. 10, 2011

(65) Prior Publication Data

US 2011/0233834 A1 Sep. 29, 2011

(30) Foreign Application Priority Data

Mar. 29, 2010 (JP) ................................. 2010-075763

(51) Int. Cl.
*F16F 15/08* (2006.01)
*F16C 7/04* (2006.01)

(52) U.S. Cl.
USPC ..................... 267/140.12; 267/293; 74/579 E (58) Field of Classification Search .................. 267/136, 267/140.11, 140.12, 140.13, 140.14, 140.15, 267/140.3, 140.4, 138, 139, 292, 293; 280/93.51; 403/220, 225, 226; 74/579 R, 581, 579 E
See application file for complete search history.

(56) References Cited

U.S. PATENT DOCUMENTS

| | | | |
|---|---|---|---|
| 4,964,516 A | 10/1990 | Thorn | |
| 6,068,247 A * | 5/2000 | Rudolph | 267/140.12 |

FOREIGN PATENT DOCUMENTS

| | | |
|---|---|---|
| EP | 0481144 | 4/1992 |
| FR | 2896021 | 7/2007 |
| JP | 05-306730 | 11/1993 |
| JP | 11-063107 | 3/1999 |
| JP | 2005-163843 | 6/2005 |
| JP | 2005-163844 | 6/2005 |
| JP | 2006-349068 | 12/2006 |
| JP | 2008-024267 | 2/2008 |
| JP | 2008-249113 | 10/2008 |
| JP | 2009-108906 | 5/2009 |
| JP | 2010-031894 | 2/2010 |

OTHER PUBLICATIONS

European Search Report on Jul. 22, 2011.

* cited by examiner

*Primary Examiner* — Thomas J Williams (74) *Attorney, Agent, or Firm* — Greenblum & Bernstein P.L.C.

(57) ABSTRACT

A second bush of a torque rod is fastened and fixed such that a mating fastening member sandwiches an inner fitting in the axial direction. A rubber stopper on an acceleration side projecting from an outer fitting to the inner fitting is provided such that the rubber thickness increases toward a front end. The inner fitting is provided with a stopper contact forming a recessed space in which the rubber stopper is inserted. After the rubber stopper comes in contact with the stopper contact in a stopper function, the rubber stopper is deformed so as to fill the recessed space, and concurrently bulges in the axial direction to come in contact with the mating fastening member.

8 Claims, 11 Drawing Sheets

STOPPER STRUCTURE OF TORQUE ROD

CROSS-REFERENCE TO RELATED APPLICATIONS

The present application claims priority under 35 U.S.C. §119 of Japanese Application No. 2010-075763, filed on Mar. 29, 2010, which is herein expressly incorporated by reference in its entirety.

BACKGROUND OF THE INVENTION

1. Field of the Invention

The present invention relates to a torque rod mounted straddling an engine side and a body side of a vehicle, regulating displacement in a roll direction and in an anteroposterior direction of the engine, and isolating vibration between the engine side and the body side.

2. Description of Related Art

Conventionally, a torque rod of this type has a first bush on one end, a second bush on the other end, and a rigid connecting portion connecting the first bush and the second bush, the first bush and the second bush each having a rigid tubular outer member, a rigid inner member provided inside the outer member, and a rubber elastic body provided between the outer member and the inner member. The torque rod, which is mounted straddling an engine side and a body side of a vehicle, receives torque from the engine, and regulates displacement in a roll direction and displacement in an anteroposterior direction of the engine (displacement in the roll direction is represented in the description below). It is required for such a torque rod to maintain a low spring constant of the rubber elastic body at a time of low load input in idling mode, specifically at a time of vibration input having a small amplitude, so as to provide excellent vibration isolation.

Thus, at least the first bush or the second bush of the torque rod is generally provided with a rubber foot that functions as a main spring. Only the rubber foot is elastically deformed in idling mode to maintain a soft spring property, and thereby vibration is excellently damped in idling mode.

Further, in order to soften the spring property of the rubber foot, the rubber foot is extended from the inner member in a direction intersecting with the anteroposterior direction, which is a direction of main load input to the rubber foot, and thus the rubber foot is elastically deformed mainly in a shear direction at the time of load input. The torque rod of this type is disclosed in Related Arts 1, 2, and 3 listed below.

When the vehicle is accelerated, the load in the roll direction of the engine is exerted on the rubber foot. In the case where only the rubber foot receives the engine torque at this time and elastically supports the load, the rubber foot excessively deforms. Thus, a rubber stopper (rubber stopper on an acceleration side) is generally provided in a conventional torque rod separately from the rubber foot, the rubber stopper projecting from the outer member side toward the inner member side. The rubber stopper is contacted with the inner member to function as a stopper, and thus the load is elastically supported. Thereby, the rubber stopper increases the elastic support force to the load, and regulates displacement of the rubber foot, specifically a relative displacement between the inner member and the outer member.

With the rubber stopper having a spring constant harder than necessary and a high deformation resistance at this time, however, the spring constant of the rubber elastic body as a whole increases, thus deteriorating the anti-vibration performance and causing booming noise in a passenger compartment at the time of acceleration. To prevent the problems, the spring property of the rubber stopper is conventionally softened such that the spring property of the rubber elastic body as a whole is not suddenly hardened after the stopper comes in contact.

Figure 11:
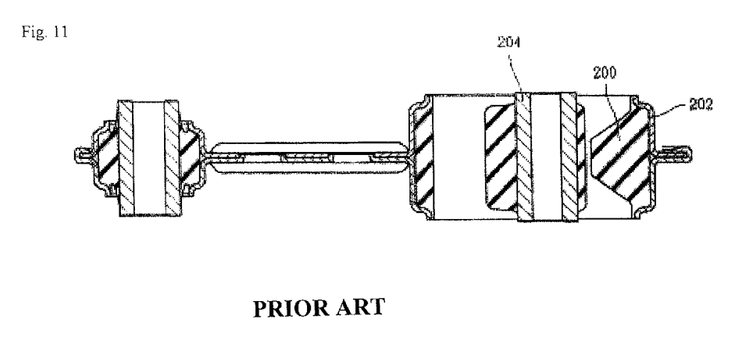
FIG. 11 illustrates an example of a conventional stopper structure of a torque rod.

FIG. 11 illustrates a concrete example of the disclosure in Related Art 1. In the example, a rubber stopper 200 on an acceleration side is formed into a shape in which the rubber thickness in the axial direction is gradually tapered from an outer member 202 side toward an inner member 204 side, and similarly the rubber thickness viewed from the axial direction is also gradually tapered toward the inner member 204 side (not shown in the drawing).

When the rubber stopper has such a shape and has a soft spring property with a low deformation resistance, however, the displacement of the rubber elastic body is great at the time of load input, including acceleration of the vehicle, thus deteriorating the durability. Further, when the displacement of the rubber elastic body, specifically a relative displacement between the inner member and the outer member is great, a wide operation space needs to be secured for the displacement, and accordingly a torque rod is enlarged. In most actual cases, however, it is generally difficult to secure such a large space in the vehicle for installation of the torque rod.

Related Art 4 discloses an invention relating to an anti-vibration apparatus, in which a rubber bulging portion (rubber stopper) is provided on an outer tubular body (outer fitting) toward an inner tubular body (inner fitting); and a resin contact portion having a Y shape is provided on the inner tubular body. For vibration load, the resin contact portion is first contacted with the outer tubular body to function as a stopper, and subsequently the rubber bulging portion is elastically deformed to function as a stopper. Thus, the two-stage stopper function is provided. However, the disclosure, which provides the separate stoppers to function as stoppers at different timings, is different from the present invention.

Further, Related Art 5 discloses an invention relating to a liquid encapsulated bush and an anti-vibration link apparatus using the same, in which a pair of partition walls having an inverted V shape on an inner tubular body and a stopper member on an outer tubular body are provided. Rubber layers provided to the partition walls are first contacted with the outer tubular body and elastically deformed to perform a first-stage stopper function. Subsequently, the stopper member is elastically deformed to perform a second-stage stopper function. In the disclosure in Related Art 5, however, the two separate stoppers perform the stopper functions at different timings, thus it is different from the present invention.

[Related Art 1] Japanese Patent Laid-Open Publication No. 2008-249113

[Related Art 2] Japanese Patent Laid-Open Publication No. 2005-163843

[Related Art 3] Japanese Patent Laid-Open Publication No. 2005-163844

[Related Art 4] Japanese Patent Laid-Open Publication No. 2009-108906

[Related Art 5] Japanese Patent Laid-Open Publication No. 2006-349068

SUMMARY OF THE INVENTION

In view of the above circumstances, the present invention provides a stopper structure of a torque rod having a good durability capable of reducing a relative displacement between a rigid inner member and an outer member, while maintaining a low spring constant from idling to a high load range, including vehicle acceleration.

A first aspect of the present invention provides a stopper structure of a torque rod mounted straddling an engine side and a body side of a vehicle, receiving torque from the engine, and regulating displacement in a roll direction in the engine, the stopper structure including a rigid outer member having a tubular shape; a rigid inner member disposed inside the outer member; a rubber elastic body sandwiched between the outer member and the inner member; a first bush provided on one end having the outer member, the inner member, and the rubber elastic body; a second bush provided on the other end having the outer member, the inner member, and the rubber elastic body; and a rigid connector connecting the first bush and the second bush. At least one of the first bush and the second bush is fastened and fixed to a mating fastening member in a state in which the inner member is sandwiched in an axial direction by the mating fastening member. One of the first bush and the second bush is provided with a rubber stopper on an acceleration side projecting from the outer member toward the inner member; and the inner member is provided with a stopper contact on the acceleration side having a two-pronged projecting front end portion from the axial view to form a recessed space to receive insertion of the rubber stopper to the space of the projection. The rubber stopper has a shape in which a rubber thickness in the axial direction is increased toward the projecting front end portion. The mating fastening member extends axially outward of the rubber stopper; and a space for the rubber stopper to bulge axially outward is provided axially inward of the mating fastening member. The rubber stopper deforms to fill the recessed space after coming in contact with the stopper contact in a stopper function, and further bulges and deforms in the axial direction to the space to bulge to come in contact with the mating fastening member.

A second aspect of the present invention provides the stopper structure of the torque rod according to the first aspect in which one of the first bush and the second bush is provided with a rubber stopper on a deceleration side projecting from the outer member toward the inner member on a side opposite to the rubber stopper on the acceleration side in an anteroposterior direction of a vehicle with the inner member in between; and the inner member is provided with a stopper contact on the deceleration side having a two-pronged projection from the axial view to form a recessed space to receive insertion of the rubber stopper on the deceleration side to the space of the projection.

A third aspect of the present invention provides the stopper structure of the torque rod according to the first or second aspect in which the rubber stopper on the acceleration side is provided to be inserted in the recessed space of the stopper contact on the acceleration side in a state pre-assembled to the vehicle.

A fourth aspect of the present invention provides the stopper structure of the torque rod according to the one of first to third aspects in which the rubber elastic body has a pair of inverted V-shaped rubber feet obliquely extending from the inner member in a direction intersecting the anteroposterior direction of the vehicle and toward a side on which the rubber stopper on the acceleration side is positioned to reach the outer member, relative to the stopper contact on the acceleration side at a position opposite in the anteroposterior direction of the vehicle to the rubber stopper on the acceleration side facing the stopper contact.

In the stopper structure according to the present invention, the rubber stopper on the acceleration side first comes in contact with the contact surface of the internal surface of the recessed space of the stopper contact of the rigid inner member due to load input associated with vehicle acceleration, and then starts to function as a stopper. The rubber stopper is pressed against the contact surface due to further load input, and then is compressed and elastically deformed. The rubber stopper gradually fills the recessed space according to the deformation.

The rubber stopper on the acceleration side, which has entirely or substantially filled the recessed space due to the deformation, further fills the recessed space. Concurrently, the rubber stopper then bulges and deforms due to continuous load input, axially outward from a release portion at the axial end of the recessed space, specifically into the bulging space provided axially inward of the mating fastening member.

In the present invention, the rubber stopper has a shape in which the axial dimension is increased toward the front end portion projecting from the rigid outer member to the inner member, and thus the rubber thickness in the direction is increased. Thereby, when the axial dimension on the base side of the rubber stopper is provided the same as that of the outer member, the axial dimension on the front end side of the rubber stopper is larger than the dimension. Thus, the rubber volume of the rubber stopper can be larger than one shown in FIG. 11, for example.

Thus, the rubber stopper that comes in contact with the contact surface of the internal surface of the recessed space can fill the recessed space soon along with the deformation caused by the subsequent load input. Further, bulging deformation associated with bulging from the recessed space to axially outward can start at a relatively early stage. Thereafter, the bulging amount to the bulging space increases due to further high load input, and, at a certain point, the rubber stopper comes in contact with the mating fastening member extending axially outward.

In the present invention, the stopper function after the rubber stopper comes in contact with the stopper contact of the inner member is deemed as a first-stage stopper function; and the stopper function when the rubber stopper bulges and deforms to axially outward after filling the recessed space is deemed as a second-stage stopper function. Then, the stopper function after the rubber stopper comes in contact with the mating fastening member is a third-stage stopper function. Specifically, the rubber stopper coming in contact with the mating fastening member is restrained by the mating fastening member at that point, when the resistance to deformation of the rubber stopper is discontinuously increased.

While being subjected to restraint by the mating fastening member, the bulging and deforming portion of the rubber stopper expands along the mating fastening member due to subsequent higher load input. The bulging amount to the bulging space increases with the expansion of the contact surface to the mating fastening member. Accordingly, the deformation resistance of the rubber stopper continuously increases, more specifically, the spring hardness continuously increases.

As described above, along with the phased change in the state of deformation, the rubber stopper of the present invention switches the stopper function from the first-stage stopper function, to the second-stage stopper function, to the third-stage stopper function in a phased manner. The shape of the rubber stopper is designed accordingly in advance.

With the stopper structure of the torque rod of the present invention, the displacement of the rubber elastic body as a whole can be reduced up to high load input, and thus the durability life can effectively be enhanced. Further, the required operation space can be small, and thus the torque rod can be downsized.

As shown in FIG. 11, for instance, when a rubber stopper has a soft spring property (weak spring force), the displacement of the rubber elastic body is large after the rubber stopper comes in contact with the inner member in vehicle acceleration. In this case, the spring constant can be maintained low even in a process in which the rubber stopper functions as a stopper. However, the displacement of the rubber elastic body as a whole is large. It is thus required to provide a second rubber stopper on the acceleration side so as to come in contact with the inner member to regulate excessive displacement, the second rubber stopper having a thinner rubber thickness and a harder spring property than the rubber stopper 200 and being provided to the outer member.

In this case, however, after the second rubber stopper comes in contact with the inner member, the spring property of the rubber elastic body as a whole is suddenly hardened, and thus the spring constant is suddenly increased. Specifically, the spring property curve (load-deflection property curve) shows a sharp rise. With the stopper structure of the present invention, the state of deformation of the single rubber stopper on the acceleration side changes, and thereby the spring force is increased. Thus, the displacement up to high load input can be reduced, and concurrently the spring constant can be maintained low.

In the second aspect of the present invention, the rubber stopper on the deceleration side is provided on the opposite side in the anteroposterior direction to the rubber stopper on the acceleration side with the inner member in between, the rubber stopper on the deceleration side projecting from the outer member to the inner member. The inner member is provided with the stopper contact on the deceleration side projecting in two prongs toward the rubber stopper on the deceleration side and forming the recessed space where the rubber stopper on the deceleration side is inserted in a space of the projection. Thereby, the recessed space of the stopper contact can effectively be used on the deceleration side, thus capable of continuously and efficiently increasing the spring property, while maintaining a soft stopper contact (stopper touch) in the stopper function.

In the present invention, the rubber stopper on the acceleration side can be provided so as to be inserted in the recessed space of the stopper contact on the acceleration side in a state pre-assembled to a vehicle (third aspect). Thereby, the recessed space can be filled by the rubber stopper on the acceleration side at an early stage of the stopper function during acceleration.

Further, the rubber elastic body may be provided with a pair of rubber feet as defined in the fourth aspect. The rubber feet are mainly subjected to shear elastic deformation relative to load input in the anteroposterior direction of the vehicle. According to the fourth aspect, the rubber feet can thus have a spring property in the anteroposterior direction of the vehicle.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 6(*a*) to 6(*c*) illustrate functions of the stopper structure of the torque rod according to the embodiment of the present invention;

FIGS. 7(*a*) to 7(*b*) illustrate the functions subsequent to FIGS. 6(*a*) to 6(*c*);

FIGS. 8(*a*) and 8(*b*) illustrate a stopper structure of a torque rod of a comparative example;

FIGS. 9(*a*) to 9(*c*) illustrate functions of the stopper structure in FIGS. 8(*a*) and 8(*b*);

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
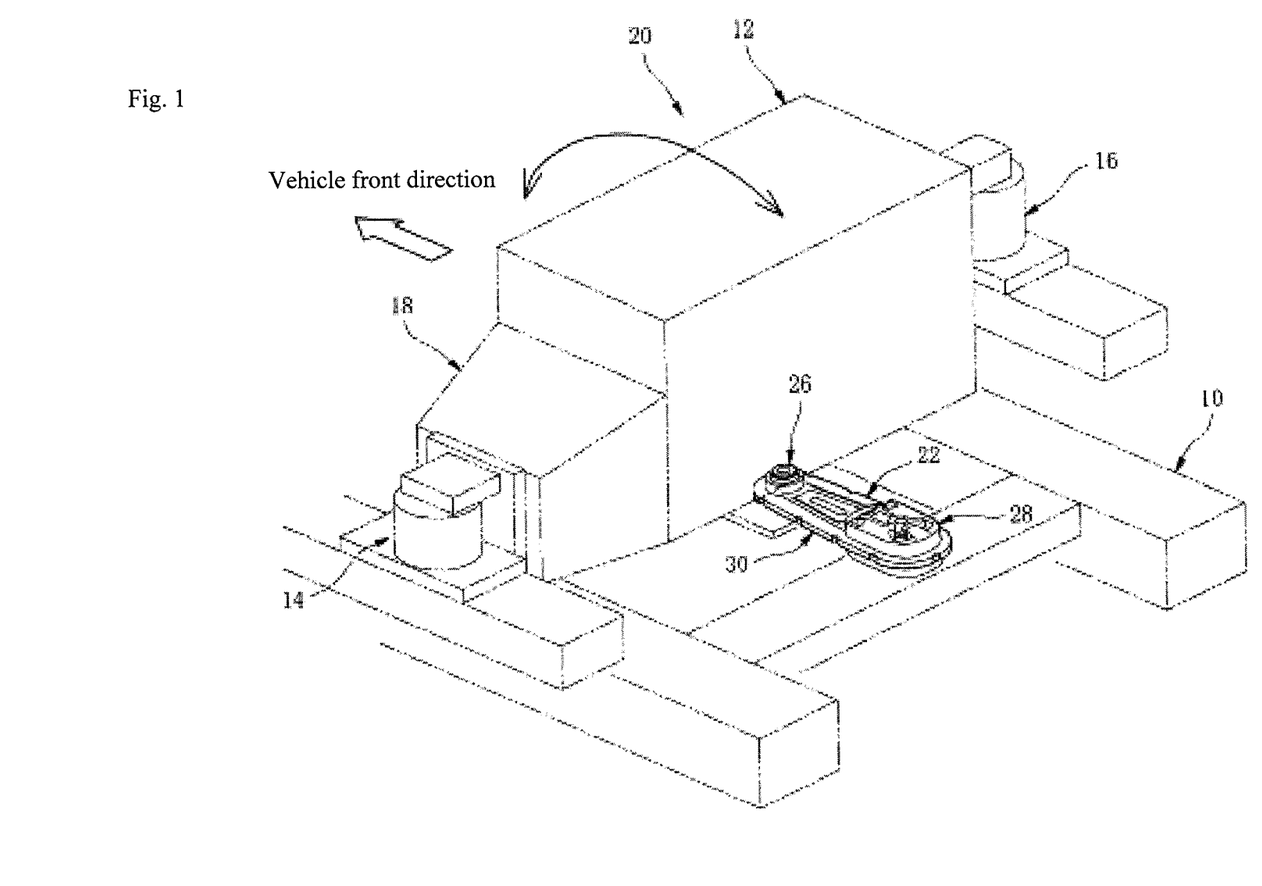
FIG. 1 illustrates a torque rod having a stopper structure according to an embodiment of the present invention, along with an engine and a suspension member.

The embodiments of the present invention are explained in detail below with reference to the drawings. In FIG. 1, an engine 12 is elastically supported on a suspension member (vehicle side) 10 of a vehicle through an engine mount 14 on the left side and an engine mount 16 on the right side. The engine mounts 14 and 16 support an entire weight of a power unit 20, to which the engine 12 and a transmission 18 are assembled.

A torque rod 22 is provided straddling the suspension member 10 and the lower portion of the engine 12. The torque rod 22 has a first bush 26 including a small bush, a second bush 28 including a large bush, and a connector 30 anteroposteriorly connecting the first bush 26 and the second bush 28. The first bush 26 of the torque rod 22 is elastically connected to the engine 12. The second bush 28 is elastically connected to the suspension member 10.

On the first bush 26 side, an inner fitting (rigid inner member) 34 hereinafter described is fixed to the engine 12. On the second bush 28 side, an inner fitting (rigid inner member) 42 is fastened and fixed with a bolt and a nut to the suspension member 10.

Figure 2:
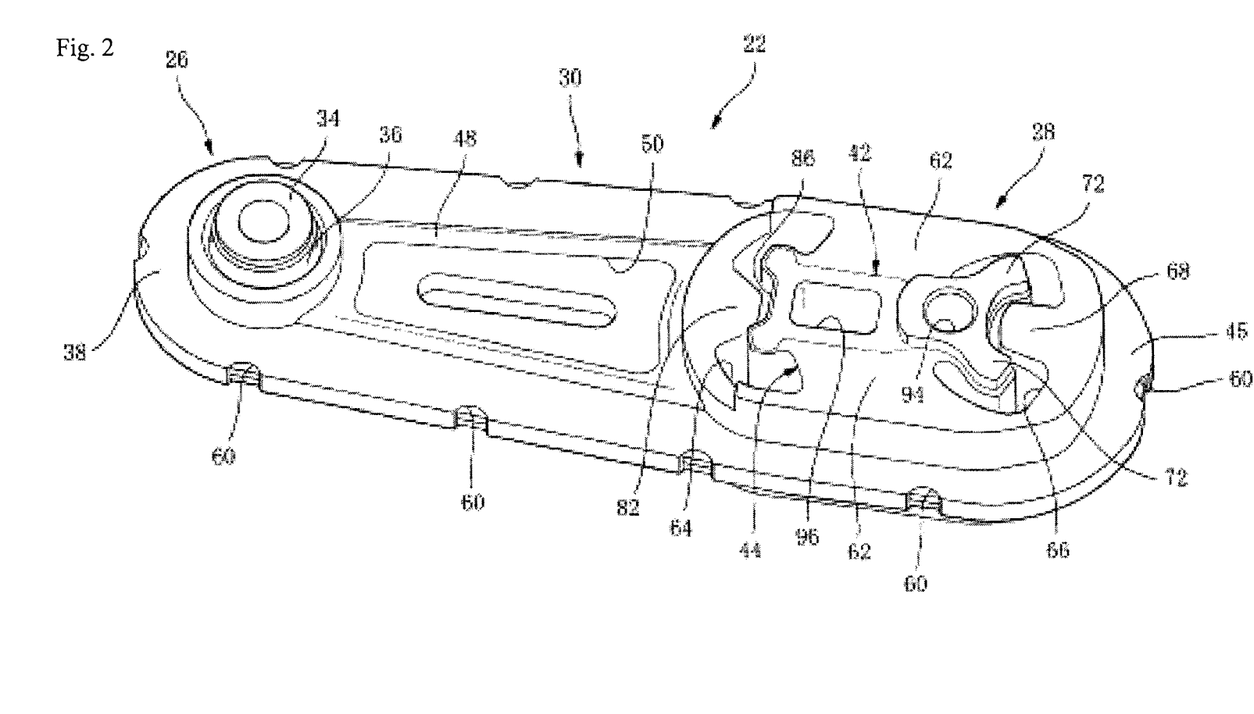
FIG. 2 is a perspective view of the torque rod in FIG. 1.
Figure 3:
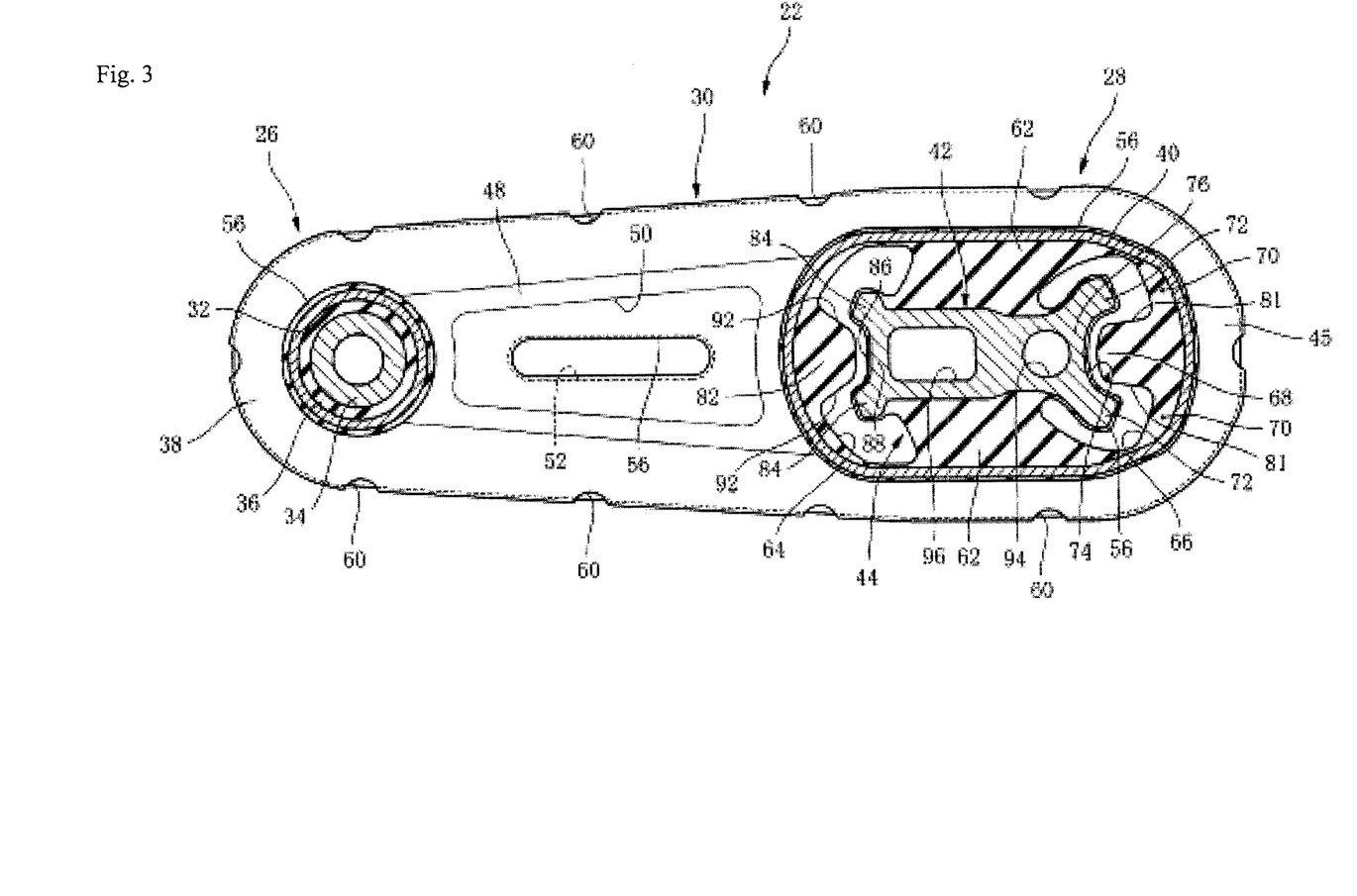
FIG. 3 is a plane cross-sectional view of the torque rod (taken from cross sectional line III-III of FIG. 4)
Figure 4:
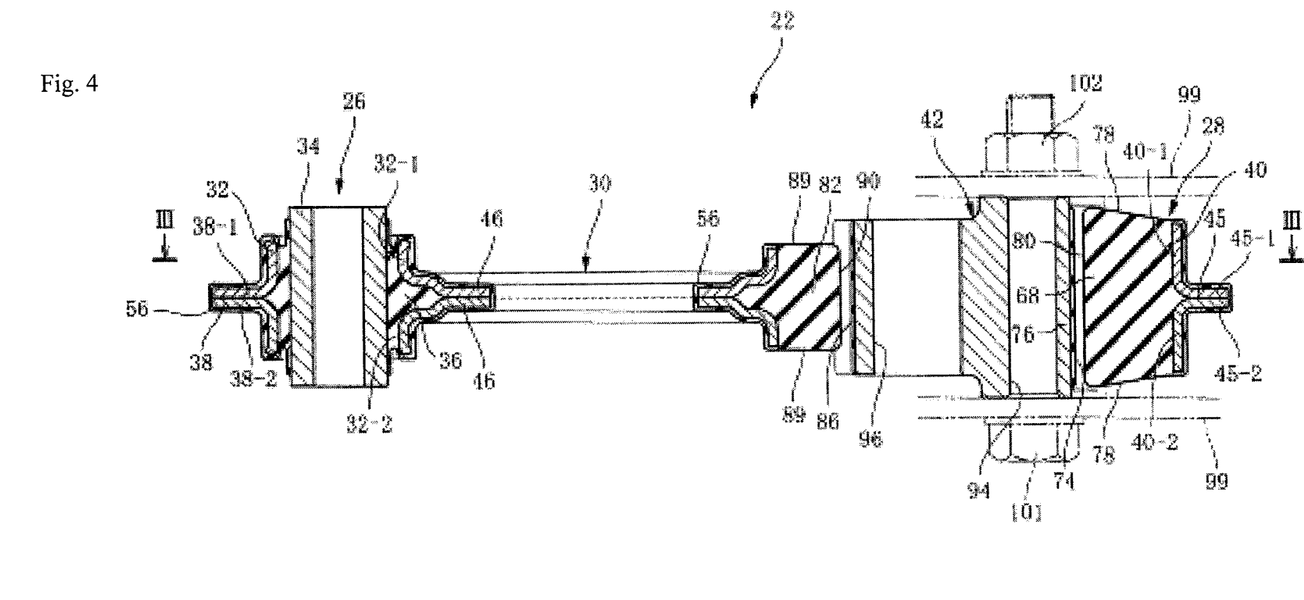
FIG. 4 is a side cross-sectional view of the torque rod.

The configuration of the torque rod 22 is specifically illustrated in FIGS. 2 to 4. In these drawings, the first bush 26 including the small bush has a cylindrical outer fitting (rigid outer member) 32, the cylindrical inner fitting 34 concentrically disposed thereinside, and a cylindrical rubber elastic body 36 provided therebetween. The components of the first bush 26 are integrally vulcanized. A brimmed portion 38 having substantially a semicircular shape is provided on the external periphery of the first bush 26.

The second bush 28 including the large bush has a cylindrical outer fitting (rigid outer member) 40, the inner fitting 42, and a rubber elastic body 44. The cylindrical outer fitting 40 has substantially an oval shape in the horizontal direction in the drawing. The inner fitting 42, which is similarly elongated in the horizontal direction in the drawing, is disposed inside the outer fitting 40. The rubber elastic body 44 is integrally vulcanized between the outer fitting 40 and the inner fitting 42. A brimmed portion 45 having a corresponding shape is also provided on the external periphery of the second bush 28.

The connector 30 is composed of a pair of vertically layered metal planar portions 46, as shown in FIG. 4. The planar portions 46 are integrally welded. The planar portions 46 are provided with ribs 48 bulging from the planar surfaces. A shallow recess 50 is provided inside the rib 48. An opening 52 is provided in the central portion of the recess 50, the opening 52 having an elongated hole shape in the horizontal direction in the drawing, or in the longitudinal direction of the torque rod 22.

The external surfaces of the pair of planar portions 46 are covered by a thin covering rubber 56. This applies to the first bush 26 and the second bush 28. Specifically, the external surfaces of the outer fitting 32 and the brimmed portion 38 of the first bush 26 are covered by the covering rubber 56; and the external surfaces of the outer fitting 40 and the brimmed portion 45 of the second bush 28 are covered by the covering rubber 56. The internal surface of the opening 52 in the connector 30 is also covered by the covering rubber 56.

Figure 5:
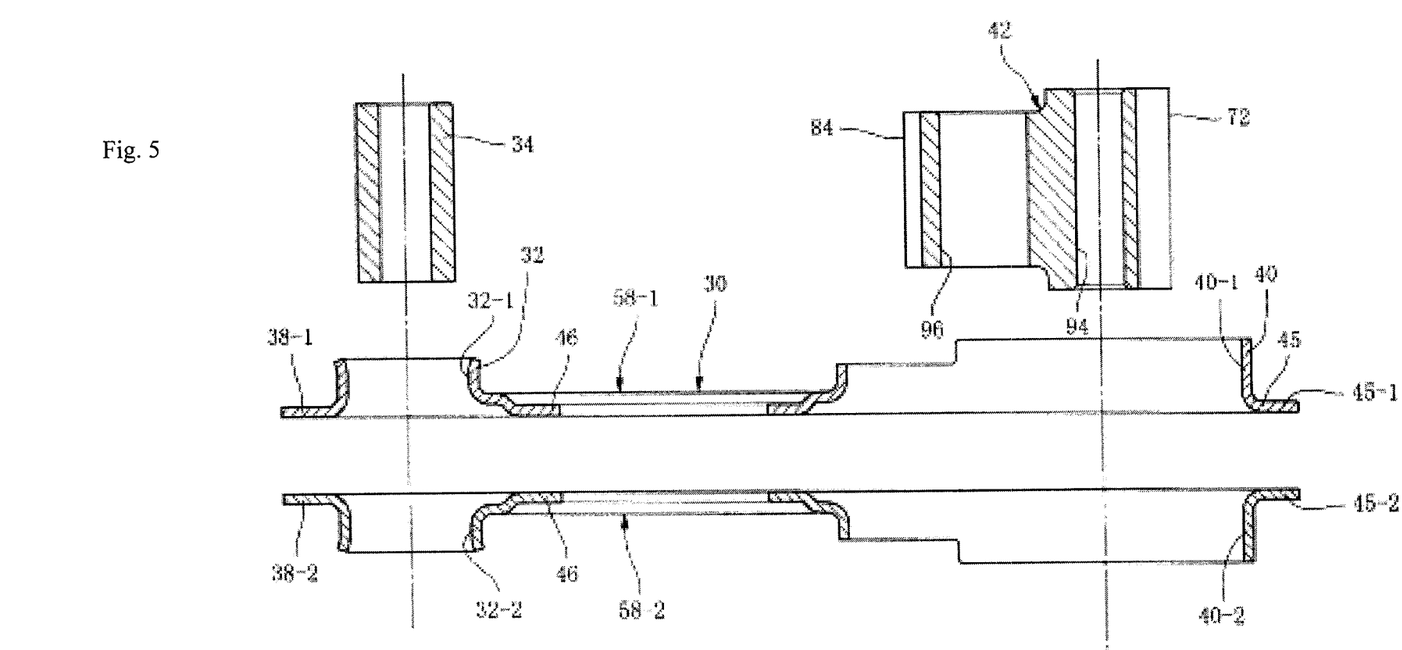
FIG. 5 illustrates a disassembled metal plate included in a metal portion of the torque rod, along with an inner fitting.

In the present embodiment, the metal portions of the torque rod 22 (excluding the inner fittings 34 and 42) are composed of a pair of metal plates 58-1 and 58-2 shown in FIG. 5. Specifically, the outer fitting 32 and the brimmed portion 38 of the first bush 26, the outer fitting 40 and the brimmed portion 45 of the second bush 28, and the pair of planar portions 46 in the connector 30 are integrally composed of the pair of metal plates 58-1 and 58-2.

Specifically, the outer fitting 32 of the first bush 26 is composed of a pair of half potions 32-1 and 32-2 having a cylindrical shape. Similarly, the outer fitting 40 of the second bush 28 is also composed of a pair of half portions 40-1 and 40-2. The half portion 32-1 of the first bush 26, the half portion 40-1 of the second bush 28, and the first planar potion 46 of the connector 30 are integrally composed of the metal plate 58-1 of FIG. 5. Further, the half portion 32-2 of the first bush 26, the half portion 40-2 of the second bush 28, and the second planar portion 46 of the connector 30 are integrally composed of the metal plate 58-2 of FIG. 5.

The brimmed portion 38 of the first bush 26 is also composed of a pair of half portions 38-1 and 38-2. Similarly, the brimmed portion 45 of the second bush 28 is also composed of a pair of half portions 45-1 and 45-2. Then, the half portions 38-1 and 45-1 are integrally composed of the metal plate 58-1; and the half portions 38-2 and 45-2 are integrally composed of the other metal plate 58-2. The pair of metal plates 58-1 and 58-2 has a vertically symmetrical shape in FIG. 5. In other words, the metal plates 58-1 and 58-2 are composed of the same members and disposed vertically opposite to each other.

In the present embodiment, crescent holes 60 open to outside are provided to the covering rubber 56 at predetermined intervals along the external peripheries of the connector 30 and the brimmed portions 38 and 45, as shown in FIG. 3. The holes 60 are formed by pins provided to a vulcanizing mold in a process of vulcanizing and molding rubber. Specifically, a rubber material is injected in a state in which the pair of metal plates 58-1 and 58-2 is set in the vulcanizing mold, and thus the all materials are integrally vulcanized and molded. In the process, a product cannot be vulcanized and molded in a good condition if the metal plates 58-1 and 58-2 are lifted due to injection pressure of the rubber. To prevent this, the pair of metal plates 58-1 and 58-2 is pressed in a layered state by using pins provided to the vulcanizing mold, and the rubber is injected in the state for vulcanizing and molding.

The holes 60 are formed in the process by the pins provided to the vulcanizing mold. Specifically, providing the holes 60 allows the rubber to be vulcanized and molded while the pair of metal plates 58-1 and 58-2 is layered and maintained in a good condition. A circular hole may be provided to the covering rubber 56 in a position more inward than the above-described external periphery of the connector 30.

As shown in FIG. 3, the rubber elastic body 44 of the second bush 28 has a pair of inverted V-shaped rubber feet 62. From a position more toward the left in the drawing than a stopper contact 76 on an acceleration side hereinafter described in the inner fitting 42, the rubber feet 62 extend in the vertical direction in FIG. 3, specifically in a direction orthogonal to the longitudinal direction of the torque rod 22 (vehicle anteroposterior direction), which is a main load input direction, and slightly obliquely toward the right in the drawing; and reach the outer fitting 40.

The pair of rubber feet 62 is mainly subjected to shear elastic deformation to support main load input in the longitudinal direction of the torque rod 22, or the vehicle anteroposterior direction. Then, the rubber feet 62 exhibit a vibration isolation effect (mainly vibration isolation effect in idling mode) based on the elastic deformation.

The rubber elastic body 44 is provided with empty portions 64 and 66 in positions on the front side (left side in the drawing) and the rear side (right side in the drawing), respectively, of a vehicle. Further, the rubber elastic body 44 is provided with a rubber stopper 68 on an acceleration side projecting toward the left in the drawing from the outer fitting 40 to the inner fitting 42. Furthermore, a thin rubber 70 is provided extending in a circumferential direction from the base of the rubber stopper 68 along the outer fitting 40.

The stopper contact 76 on the acceleration side is provided to the inner fitting 42. The stopper contact 76 has a front end portion projecting and splitting into two portions in a Y shape from a planar view (axial view). The stopper contact 76 is provided with a recessed space 74 to insert the rubber stopper 68 between a pair of projections 72. The internal surface of the recessed space 74 has a straight surface in the vertical direction of FIG. 2 and a curved surface having a recess shape curving toward the left in FIG. 3. Two axial end portions of the recessed space 74 each have an open shape.

As shown in FIG. 4, the vertical dimension in FIG. 4, or the axial dimension, on the base side (base end side) of the rubber stopper 68 is substantially the same as the vertical direction in the drawing of the outer fitting 40. The axial dimension, or the vertical dimension in FIG. 4, of the rubber stopper 68 gradually increases from the base portion to the front end projecting toward the inner fitting 42. The rubber thickness thus increases toward the front end and is at a maximum at the front end (in some cases, the portion having the maximum rubber thickness may be provided immediately before the front end, and the rubber thickness at the front end may be slightly less than the portion).

The rubber stopper 68 has upper and lower end surfaces (axial end surfaces) 78 in FIG. 4, which are inclined surfaces inclining toward the front end in an opposite direction to each other. A front end surface 80 has a curved surface corresponding to the shape of the recessed space 74 from a planar view shown in FIG. 3. Further, the front end surface 80 has a straight surface in the vertical direction in FIG. 4, or the axial direction.

The rubber stopper 68 also has a pair of side surfaces 81 in FIG. 3, which are slightly inclined surfaces approaching each other from the base portion toward the front end of the rubber stopper 68. Specifically, the width in FIG. 3 of the rubber stopper 68 slightly reduces from the base portion toward the front end.

In the present embodiment, the front end of the rubber stopper 68 is inserted into the recessed space 74 of the stopper contact 76 of the inner fitting 42 in a state pre-assembled to a vehicle, or in a vehicle stopped state. Further, the rubber stopper 68 is provided opposite to the internal surface of the recessed space 74 with a predetermined stopper clearance in between.

A rubber stopper 82 on a deceleration side is provided to the rubber elastic body 44 of the second bush 28 at a position opposite to the above-described rubber stopper 68 on the acceleration side having the inner fitting 42 in between. The rubber stopper 82 projects to the right in the drawing from the outer fitting 40 toward the inner fitting 42, or to the rear direction of the vehicle.

Correspondingly, the inner fitting 42 is provided with a stopper contact 88 on the deceleration side opposite to the rubber stopper 82, the stopper contact 88 projecting in two prongs toward the rubber stopper 82 on the deceleration side, and forming a recessed space 86 between a pair of projections 84. The recessed space 86 has a shorter depth than the recessed space 74 of the stopper contact 76 on the acceleration side.

The rubber stopper 82 on the deceleration side has a constant rubber thickness in the axial direction from a base portion to a front end thereof, as shown in FIG. 4. An end surface 89 in the vertical direction in the drawing (axial direction) is a straight surface in the horizontal direction in FIG. 4. A front end surface 90 is also a straight surface in the vertical direction in FIG. 4.

Meanwhile, a pair of upper and lower side surfaces 92 in FIG. 3 is inclined surfaces approaching each other from the base portion toward the front end. Specifically, the rubber stopper 82 on the deceleration side has a planar shape whose rubber thickness gradually reducing from the base portion toward the front end from a planar view shown in FIG. 3.

A portion of the front end of the rubber stopper 82 on the deceleration side is also inserted into the recessed space 86 in a vehicle stopped state. The rubber stopper 82 is provided opposite to the internal surface of the recessed space 86 with a predetermined stopper clearance in between. The external surfaces of the stopper contacts 76 and 88 are covered by the covering rubber 56.

The inner fitting 42 is further provided with a fixing through-hole 94 through which a fastening bolt 101 is inserted. Furthermore, another through-hole 96 is provided adjacent to the fixing hole 94.

As shown in FIG. 4, the second bush 28 is fastened and fixed to a pair of planar portions (mating fastening member) 99 of the suspension member 10 with the bolt 101 and a nut 102 inserted through the fixing hole 94, in a state in which the inner fitting 42 is sandwiched between the planar portions 99 in the axial direction. The pair of planar portions 99 extends axially outside the rubber stopper 68 on the acceleration side, and forms axially inside the planar portions 99, a space for the rubber stopper 68 to bulge axially outward.

Figure 6A:
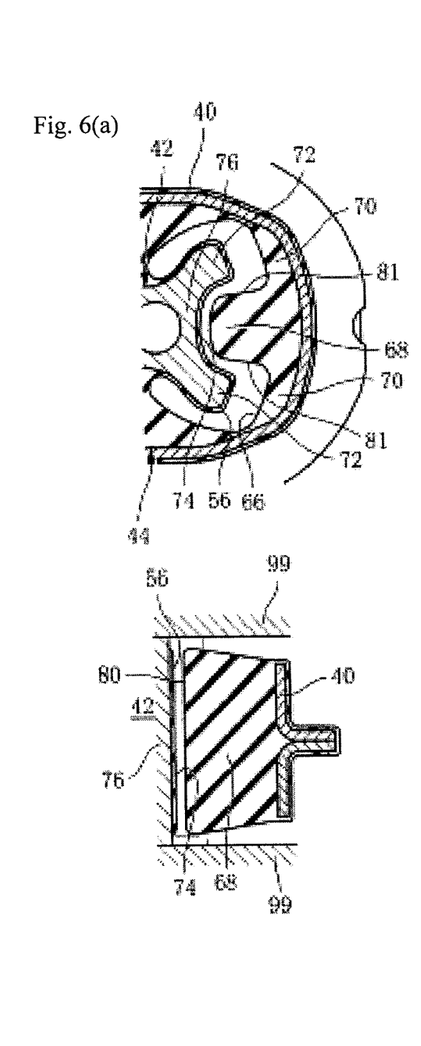

Functions of the present embodiment are explained below. As shown in FIGS. 3, 4, and 6(a), the rubber stopper 68 on the acceleration side in the present embodiment is inserted into the recessed space 74 of the stopper contact 76 on the acceleration side in a vehicle stopped state, and is provided opposite to the internal surface of the recessed space 74 with a predetermined stopper clearance as described above.

Figure 10:
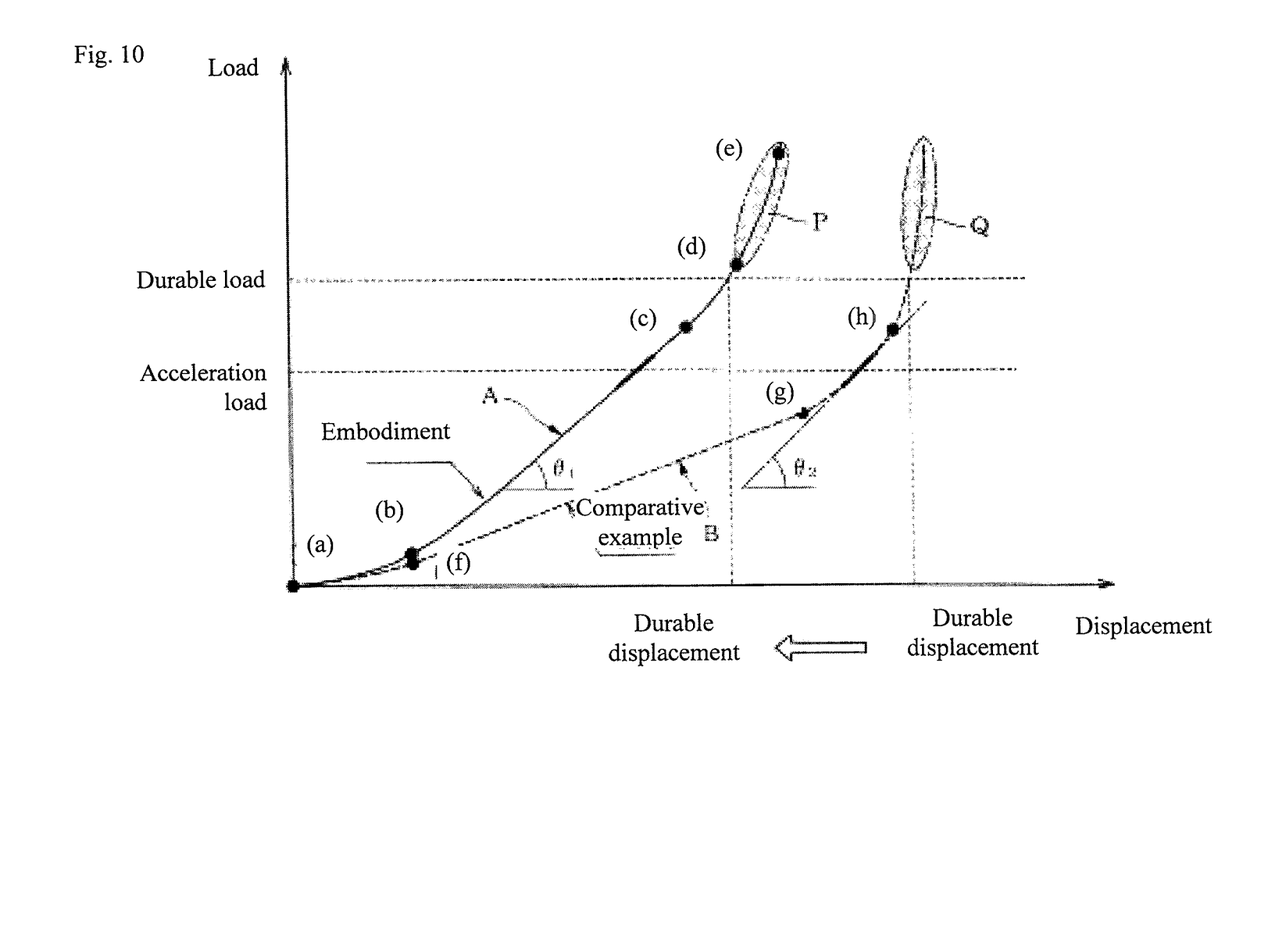
FIG. 10 illustrates a spring property curve of the torque rod according to the present embodiment, along with that of the comparative example.

FIG. 10 illustrates a spring property curve (load-deflection property curve) of the rubber elastic body 44 of the second bush 28 in the torque rod in the present embodiment, along with a comparative example. A point (a) on the spring property curve A represents a relationship of displacement and load in a state of FIG. 6(a). An anti-vibration function in vehicle idling mode is performed in the state, in which the rubber feet 62 are mainly subjected to shear elastic deformation to absorb vibration input of a minute amplitude and isolate the vibration.

The acceleration load along the vertical axis in FIG. 10 refers to load set as load exerted on the torque rod in acceleration in a normal vehicle run. The durable load refers to load exerted on the torque rod associated with motions, such as an engine shake, normally generated in a vehicle run, regardless of acceleration and deceleration. The durable load is set higher than the acceleration load. A load range higher than the durable load is rarely observed in a normal run. The load range is a range in which a large load unexpectedly occurs such as when driving over a bump.

Figure 6B:
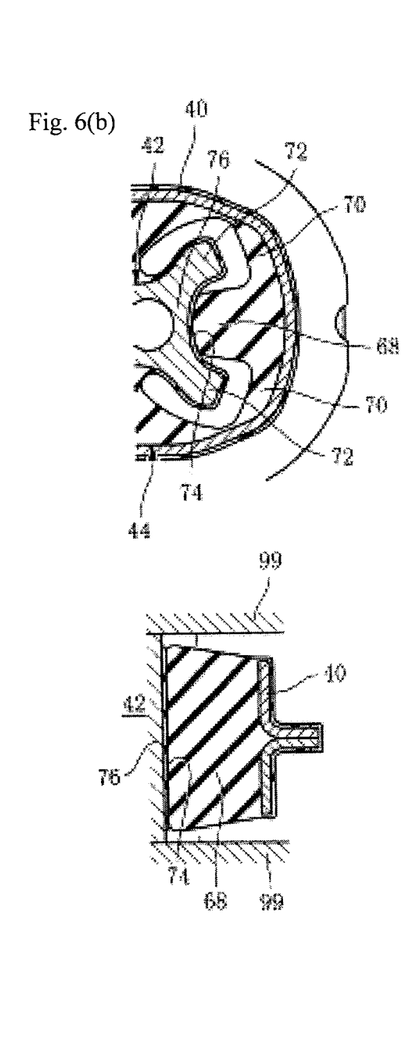

When a pulling force in the left direction in the drawing is exerted on the outer fitting 40 of the torque rod 22 according to acceleration of the vehicle, the rubber stopper 68 on the acceleration side is deeply inserted into the recessed space 74 of the inner fitting 42 along with elastic deformation of the rubber feet 62 of the second bush 28, and the front end of the rubber stopper 68 comes in contact with the internal surface of the recessed space 74 at a certain point. FIG. 6(b) illustrates the state at this moment. Further, a point (b) in the FIG. 10 represents the relationship between displacement and load.

Figure 6C:
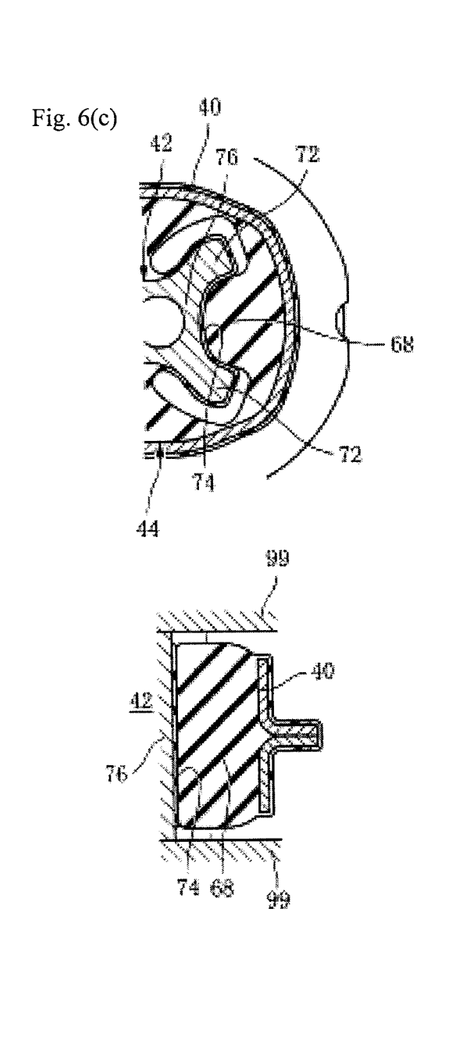

When the load is further input to the second bush 28 from this state, the rubber stopper 68 gradually fills the recessed space 74 along with compressed elastic deformation, and eventually the deformed rubber stopper 68 fills almost all the recessed space 74. FIG. 6(c) illustrates the state at this moment. Further, a point (c) in the FIG. 10 represents the relationship between displacement and load.

As shown in FIG. 10, from the time when the rubber stopper 68 comes in contact with the stopper contact 76, the spring hardness of the entire rubber elastic body 44 is slightly increased (the spring force is slightly increased). The load exerted on the rubber elastic body 44 also increases along with an increase in further displacement. During the stage until the state represented by FIG. 6(c), the spring property changes maintaining substantially a linear property. Specifically, the displacement increases substantially in proportion to the increase in the load exerted on the rubber elastic body 44.

In the present embodiment, the rubber thickness of the rubber stopper 68 increases in the axial direction toward the front end, and the rubber volume of the rubber stopper 68 is large. Thus, the rubber stopper 68 completes filling the recessed space 74 at a relatively early stage and in limited displacement from the state shown in FIG. 6(b) to the state shown in FIG. 6(c), specifically in the process in which the rubber stopper 68 on the acceleration side fills the recessed space 74 of the stopper contact 76.

Figure 7A:
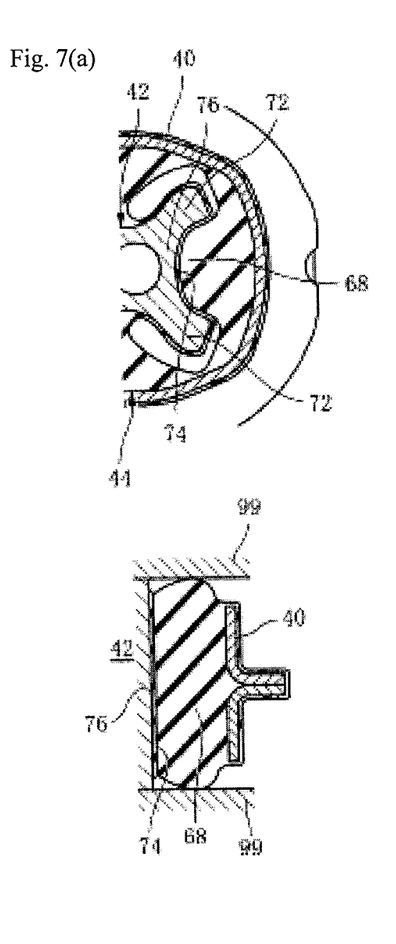

When the outer fitting 40 is displaced from the state shown in FIG. 6(c) to the left in the drawing relative to the inner fitting 42 due to additional load input, the rubber stopper 68, which has already filled the recessed space 74 of the stopper contact 76 or is almost filling the recessed space 74, protrudes axially outward from a release portion at the axial end of the stopper contact 76, and then bulges and deforms. At a certain stage, the portion bulging axially outward comes in contact with the planar portions 99 extending axially outward of the rubber stopper 68. FIG. 7(a) illustrates the state. A point (d) in FIG. 10 represents the relationship between displacement and load at this time.

Figure 7B:
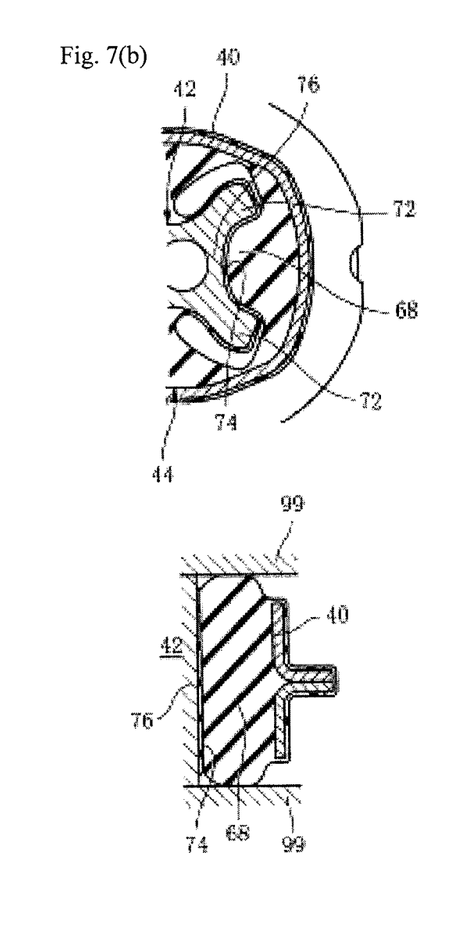

When the load exerted on the rubber elastic body 44 further increases after the portion of the rubber stopper 68 bulging axially outward from the recessed space 74 comes in contact with the planar portions 99 as shown in FIG. 7(a), the rubber stopper 68 expands the contact area with the pair of planar portions 99 as being confined thereby, and the bulging amount axially outward further increases. FIG. 7(b) illustrates the state. A point (e) in FIG. 10 represents the relationship between displacement and load at this time. An area P represents an area of spring property change in the process from the state of FIG. 7(a) to FIG. 7(b).

When the rubber stopper 68 deforms from the state shown in FIG. 7(a) to the state shown in FIG. 7(b), the large resistance is generated in the deformation of the rubber stopper 68 since the rubber stopper 68 is subjected to confinement of the pair of planar portions 99. Specifically, the deformation resistance of the rubber stopper 68 suddenly increases in the state shown in FIG. 7(a), and accordingly the spring property of the rubber elastic body 44 is suddenly hardened, as shown with P indicating a sharp rise of the spring property curve in FIG. 10.

As shown with the spring property curve A in FIG. 10, the displacement of the rubber elastic body 44 can be reduced up to the high load input in the stopper structure of the present embodiment. Thus, the durability life is long, which is clear from a comparative example shown in FIGS. 8(a) and 8(b).

Figure 8A:
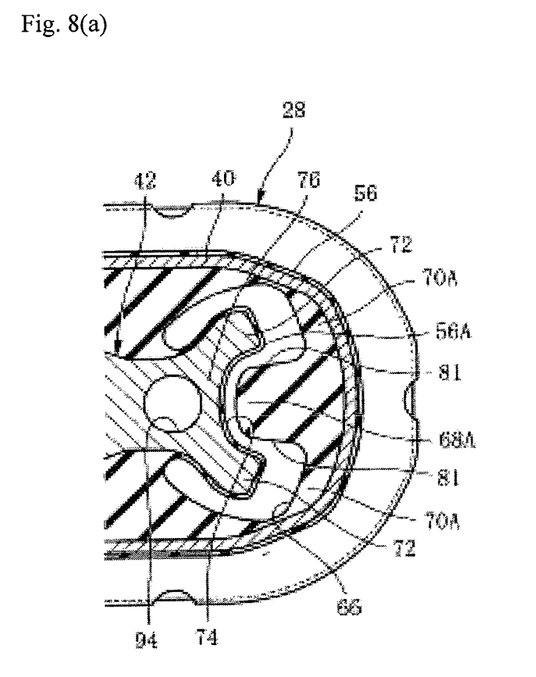
Figure 8B:
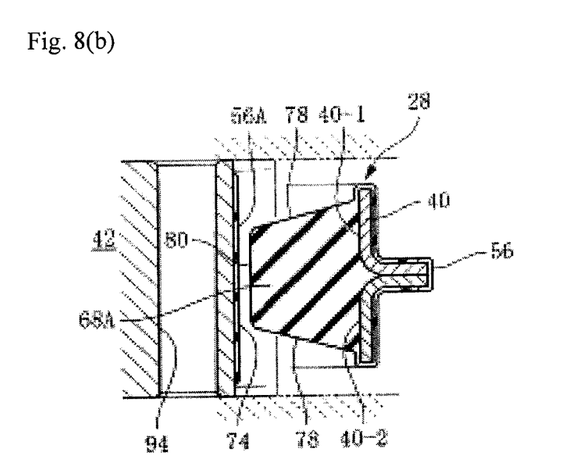

In the comparative example shown in FIGS. 8(a) and 8(b), a rubber stopper 68A on the acceleration side has a shape in which the rubber thickness is gradually reduced in the axial direction from the outer fitting 40 toward the inner fitting 42, specifically toward a front end of the rubber stopper 68A projecting to the inner fitting 42. Thus, the rubber stopper 68A on the acceleration side has a low deformation resistance and a soft spring property in the comparative example. Accordingly, even after the rubber stopper 68A comes in contact with the stopper contact 76, the spring force of the rubber elastic body 44 is weak as a whole. The elastic support force against the input load is thus weak, and the displacement is naturally large.

Figure 9A:
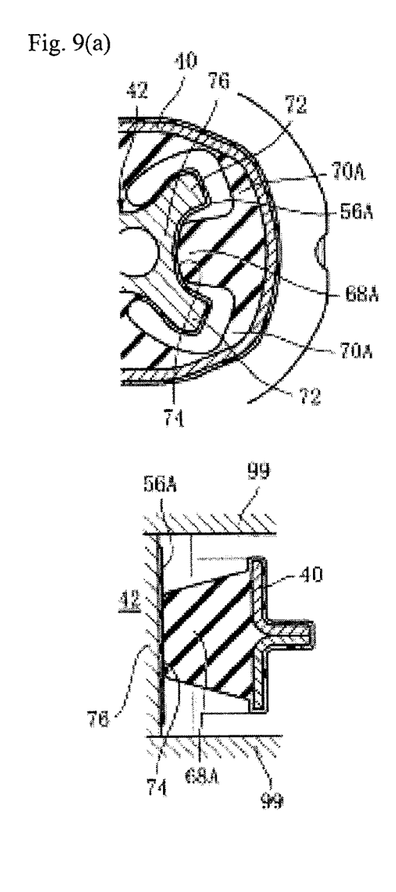
Figure 9B:
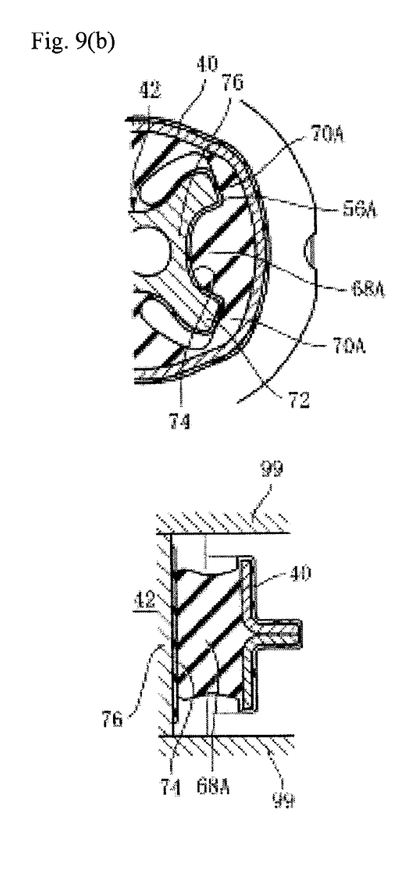
Figure 9C:
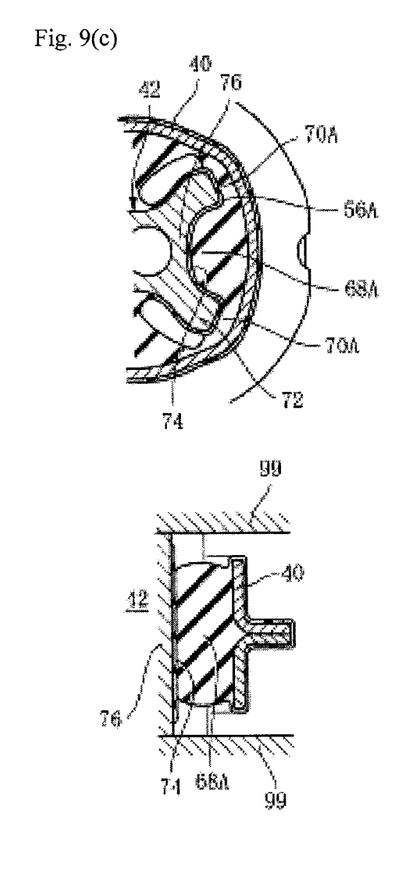

FIGS. 9(a) to 9(c) illustrate changes in the deformation state of the rubber stopper 68A shown in FIGS. 8(a) and 8(b) relative to the load input. The spring property curve of the comparative example is represented by B in FIG. 10. FIG. 9(a) illustrates a state in which the rubber stopper 68A comes in contact with the internal surface of the recessed space 74 of the stopper contact 76. FIG. 9(b) illustrates a state in which the rubber stopper 68A is compressed and elastically deformed from the state of FIG. 9(a).

The state of FIG. 9(b) corresponds to the state of FIG. 6(b). As shown in FIG. 9(b), the rubber stopper 68A has not filled the recessed space 74 in the state in the comparative example. The rubber stopper 68A is deformed in the axial direction by the additional continuing load input, and ends up further slightly filling the recessed space 74. In the entire process of the stopper function of the rubber stopper 68A, the spring property curve B changes while maintaining substantially a linear property as shown in FIG. 10 (refer to a portion from a point (f) to a point (g)). In the comparative example shown in FIGS. 8(a) and 8(b), the displacement thus cannot be retained under the allowable displacement at the time of high load input only with the stopper function of the rubber stopper 68A.

In the comparative example shown in FIGS. 8(a) and 8(b), the pair of projections 72 of the stopper contact 76 finally comes in contact with a thin rubber 70A on the outer fitting 40 through a covering rubber 56A due to the further displacement from the state shown in FIG. 9(b). Then, the spring property curve first starts to rise due to the stopper function of the thin rubber 70A. Specifically, in the comparative example in FIGS. 8(a) and 8(b), the thin rubber 70A functions as the second rubber stopper on the acceleration side. The stopper function of the second rubber stopper regulates the displacement in high load input.

A point (g) in FIG. 10 represents the relationship between displacement and load in the state of FIG. 9(b). A point (h) in FIG. 10 represents the relationship between displacement and load in the state of FIG. 9(c). An area Q in FIG. 10 represents an area of the spring property curve in which the pair of projections 72 further compresses the thin rubber 70A due to further load input from the state of FIG. 9(c).

As shown in FIG. 10, the rise of the spring property curve in the area P of the present embodiment is moderate compared to the spring property curve in the area Q of the comparative example. The spring constant (dynamic spring constant) represented by inclinations $\theta_1$ and $\theta_2$ under acceleration load is substantially the same in the present embodiment and the comparative example ($\theta_1$ and $\theta_2$ are substantially the same). Further, the displacement when the same durable load is exerted is smaller in the present embodiment than in the comparative example, as shown in FIG. 10.

According to the present embodiment, the displacement of the rubber elastic body can be reduced up to high load input. Thus, the durability life can be long, and the operation space of the torque rod can be reduced, thus downsizing the torque rod.

The embodiment described above is merely an exemplary illustration of the present invention. For example, the mating fastening member to which the bush is fastened and fixed is not limited to the suspension member itself, but may be another fastening and fixing member separate from the suspension member, such as a bracket. Further, the installation of the torque rod is not limited to a case same as the second bush 28 in the embodiment above or a different case in which a large bush is connected to the suspension member. The present invention may be applicable to a case in which the placement is opposite to the embodiment, specifically, for example, the large bush is connected to a member disposed on the engine (power unit member, such as an engine, a motor, a converter housing, and a transmission) through a fastening and fixing member, such as a separate bracket. A modified configuration may be made in a variety of ways without departing from the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A stopper structure of a torque rod mounted straddling an engine side and a body side of a vehicle, receiving torque from the engine, and regulating displacement in a roll direction of the engine, the stopper structure comprising:
- a first bush provided on a first end of the torque rod, the first bush comprising:
- a first rigid outer member having a tubular shape,
- a first rigid inner member disposed inside the first rigid outer member, and
- a first rubber elastic body sandwiched between the first rigid outer member and the first rigid inner member;
- a second bush provided on a second end of the torque rod, the second bush comprising:
- a second rigid outer member having a tubular shape,
- a second rigid inner member disposed inside the second rigid outer member, and
- a second rubber elastic body sandwiched between the second rigid outer member and the second rigid inner member; and
- a rigid connector connecting the first bush and the second bush, wherein
- at least one of the first bush and the second bush is fastened and fixed to a mating fastening member in a state in which the corresponding one of the first rigid inner member and the second rigid inner member is sandwiched in an axial direction by the mating fastening member;
- one of the first bush and the second bush is provided with an acceleration-side rubber stopper on an acceleration side projecting from the corresponding one of the first rigid outer member and the second rigid outer member toward the corresponding one of the first rigid inner member and the second rigid inner member; and
- the corresponding one of the first rigid inner member and the second rigid inner member is provided with an acceleration-side stopper contact on the acceleration side having an acceleration-side two-pronged projecting front end portion, from the axial view, to form an acceleration-side recessed space that receives insertion of the acceleration-side rubber stopper;
- the acceleration-side rubber stopper has a shape in which a rubber thickness in the axial direction is increased toward the acceleration-side two-pronged projecting front end portion;
- the mating fastening member extends axially outward of the acceleration-side rubber stopper; and
- a bulge space for the acceleration-side rubber stopper to bulge axially outward is provided axially inward of the mating fastening member; and
- the acceleration-side rubber stopper deforms to fill the acceleration-side recessed space after coming in contact with the acceleration-side stopper contact in a stopper function, and further bulges and deforms in the axial direction into the bulge space to come in contact with the mating fastening member.

2. The stopper structure of the torque rod according to claim 1, wherein
- one of the first bush and the second bush is provided with a deceleration-side rubber stopper on a deceleration side projecting from the corresponding one of the first rigid outer member and the second rigid outer member toward the corresponding one of the first rigid inner member and the second rigid inner member on a side opposite to the acceleration-side rubber stopper in an anteroposterior direction of the vehicle with the corresponding one of the first rigid inner member and the second rigid inner member in between; and
- the corresponding one of the first rigid inner member and the second rigid inner member is provided with a deceleration-side stopper contact on the deceleration side having a deceleration-side two-pronged projection from the axial view to form a deceleration-side recessed space that receives insertion of the deceleration-side rubber stopper.

3. The stopper structure of the torque rod according to claim 1, wherein the acceleration-side rubber stopper is provided to be inserted in the acceleration-side recessed space of the acceleration-side stopper contact in a state pre-assembled to the vehicle.

4. The stopper structure of the torque rod according to claim 1, wherein one of the first rubber elastic body and the second rubber elastic body has a pair of inverted V-shaped rubber feet obliquely extending from the one of the first rigid inner member and the second rigid inner member in a direction intersecting the anteroposterior direction of the vehicle and toward a side on which the acceleration-side rubber stopper is positioned to reach the one of the first rigid outer member and the second rigid outer member, relative to the acceleration-side stopper contact at a position opposite in the anteroposterior direction of the vehicle to the acceleration-side rubber stopper.

5. The stopper structure of the torque rod according to claim 2, wherein the acceleration-side rubber stopper is provided to be inserted in the acceleration-side recessed space of the acceleration-side stopper contact in a state pre-assembled to the vehicle.

6. The stopper structure of the torque rod according to claim 2, wherein one of the first rubber elastic body and the second rubber elastic body has a pair of inverted V-shaped rubber feet obliquely extending from the one of the first rigid inner member and the second rigid inner member in a direction intersecting the anteroposterior direction of the vehicle and toward a side on which the acceleration-side rubber stopper is positioned to reach the one of the first rigid outer member and the second rigid outer member, relative to the acceleration-side stopper contact at a position opposite in the anteroposterior direction of the vehicle to the acceleration-side rubber stopper.

7. The stopper structure of the torque rod according to claim 3, wherein one of the first rubber elastic body and the second rubber elastic body has a pair of inverted V-shaped rubber feet obliquely extending from the one of the first rigid inner member and the second rigid inner member in a direction intersecting the anteroposterior direction of the vehicle and toward a side on which the acceleration-side rubber stopper is positioned to reach the one of the first rigid outer member and the second rigid outer member, relative to the acceleration-side stopper contact at a position opposite in the anteroposterior direction of the vehicle to the acceleration-side rubber stopper.

8. The stopper structure of the torque rod according to claim 5, wherein one of the first rubber elastic body and the second rubber elastic body has a pair of inverted V-shaped rubber feet obliquely extending from the one of the first rigid inner member and the second rigid inner member in a direction intersecting the anteroposterior direction of the vehicle and toward a side on which the acceleration-side rubber stopper is positioned to reach the one of the first rigid outer member and the second rigid outer member, relative to the acceleration-side stopper contact at a position opposite in the anteroposterior direction of the vehicle to the acceleration-side rubber stopper.

* * * * *